United States Patent [19]

Okawa

[11] Patent Number: 5,399,649
[45] Date of Patent: Mar. 21, 1995

[54] METHOD FOR THE PREPARATION OF DIORGANOPOLYSILOXANES

[75] Inventor: Tadashi Okawa, Chiba, Japan

[73] Assignee: Dow Corning Toray Silicone Co., Ltd., Tokyo, Japan

[21] Appl. No.: 232,938

[22] Filed: Apr. 25, 1994

[30] Foreign Application Priority Data

May 28, 1993 [JP] Japan .................. 5-151052

[51] Int. Cl.6 ........................................... C08G 77/08
[52] U.S. Cl. .................................. 528/14; 528/18; 528/33; 528/34; 528/37; 556/453
[58] Field of Search ............... 528/14, 37, 34, 33, 528/18; 556/453

[56] References Cited

U.S. PATENT DOCUMENTS 4,876,373  10/1989  Okawa et al. .................. 556/453
5,045,621  9/1991  Suzuki .......................... 528/14

FOREIGN PATENT DOCUMENTS 78236  10/1984  Japan .

Primary Examiner—Melvyn I. Marquis
Attorney, Agent, or Firm—James L. DeCesare

[57] ABSTRACT

A method for the high-purity synthesis of a diorganopolysiloxane having a functional group at only one molecular chain terminal, that is characterized by the preliminary silylation with a silylating agent of the silanol group-containing impurity present in the cyclic trisiloxane, and that is characterized by preliminarily converting the silanol group-containing impurity in the cyclic trisiloxane into a lithiated material by lithiation with an organolithium compound and then silylating this lithiated material using a silylating agent that contains silicon-bonded halogen.

4 Claims, 4 Drawing Sheets

COUNT

COUNT

METHOD FOR THE PREPARATION OF DIORGANOPOLYSILOXANES

BACKGROUND OF THE INVENTION

The present invention relates to a method for the preparation of diorganopolysiloxane. More specifically, the present invention relates to a method for the preparation of diorganopolysiloxane that yields a very pure diorganopolysiloxane that bears a functional group at only one end of the molecular chain, hereinafter referred to as monoterminal-functional diorganopolysiloxane.

In an application that utilizes the functional group reactivity of monoterminal-functional diorganopolysiloxane, monoterminal-functional diorganopolysiloxane is used as a starting material for graft organic polymer having diorganopolysiloxane chain branches. Diorganopolysiloxane of this type has the general formula $$R(R_2SiO)_pB$$

in which R is a monovalent hydrocarbon group, p is an integer with a value of at least 1, and B is the hydrogen atom or a group with the general formula $$-SiR_2R^1$$

in which R is a monovalent hydrocarbon group and $R^1$ is the hydrogen atom or an organofunctional group. Japanese Patent Application Laid Open [Kokai or Unexamined] Numbers Sho 59-78236 [78,236/1984], Hei 1-131247 [131,247/1989], and Hei 2-92933 [92,933/1990] teach the preparation of this type of diorganopolysiloxane by first subjecting cyclic trisiloxane with the general formula $$(R_2SiO)_3$$

in which R is a monovalent hydrocarbon group to nonequilibration polymerization, optionally in the presence of silane or siloxane with the general formula $$R(R_2SiO)_mH$$

in which R is a monovalent hydrocarbon group and m is an integer with a value of at least 1, under the effect of a lithium polymerization catalyst with the general formula $$R(R_2SiO)_nLi$$

in which R is a monovalent hydrocarbon group and n is an integer with a value of at least zero, and by subsequently terminating this nonequilibration polymerization with acid or halosilane with the general formula $$R^1R_2SiX$$

in which R is a monovalent hydrocarbon group, $R^1$ is the hydrogen atom or an organofunctional group, and X is a halogen atom.

However, several drawbacks are associated with the preparation of graft organic polymer using diorganopolysiloxane synthesized by the preparative method described above. Thus, the viscosity of the graft organic polymer product undergoes a sharp increase as the molecular weight of the diorganopolysiloxane increases. Moreover, the graft organic polymer product gels when diorganopolysiloxane is used that has a number-average molecular weight above 10,000.

The present inventor undertook various analyses of monoterminal-functional diorganopolysiloxane and its cyclic trisiloxane precursor. As a result of analysis of the starting cyclic trisiloxane using a Fourier-transform infrared spectrophotometer, the inventor confirmed that silanol-containing impurity was present in this cyclic trisiloxane. Gel permeation chromatographic analysis of the monoterminal-functional diorganopolysiloxane demonstrated a secondary peak on the high molecular weight side of the main peak in addition to the main peak due to the diorganopolysiloxane. It was also found that the ratio of this secondary peak increased with increasing number-average molecular weight for the diorganopolysiloxane.

These results suggested that diorganopolysiloxane having functional groups at both molecular chain terminals, hereinafter referred to as diterminal-functional diorganopolysiloxane, is produced as by-product during the synthesis of monoterminal-functional diorganopolysiloxane by the preparative method outlined above.

This diterminal-functional diorganopolysiloxane by-product is extremely difficult to separate by standard methods from the monoterminal-functional diorganopolysiloxane synthesized by the preparative method described above, and this separation becomes even more difficult at higher number-average molecular weights for the diorganopolysiloxane.

In addition, the preceding analyses also suggested that the presence of the silanol-containing impurity such as a silane, or siloxane that contains at least 2 silanol groups in the starting cyclic trisiloxane is the cause of the secondary production of the diterminal-functional diorganopolysiloxane.

However, the silanol-containing impurity is also very difficult to separate from the cyclic trisiloxane by standard methods, such as distillation, column separation using an adsorbent such as silica, alumina, activated clay, and a molecular sieve. The content of silanol-containing impurity in the cyclic trisiloxane is in fact increased in the particular case of column separation of the cyclic trisiloxane because the cyclic trisiloxane ring is in general quite easily opened by acid.

The inventor carried out extensive investigations in order to solve the problems described above and as a result discovered that a very pure monoterminal-functional diorganopolysiloxane can be produced from the nonequilibration polymerization of cyclic trisiloxane in the presence of a lithium compound by preventing the silanol-containing impurity in the cyclic trisiloxane from participating in the nonequilibration polymerization by preliminarily silylating the silanol-containing impurity in the cyclic trisiloxane with silylating agent. The present invention was achieved based on this discovery.

SUMMARY OF THE INVENTION

Specifically, the present invention takes as its object the introduction of a method for the preparation of diorganopolysiloxane that is capable of yielding a very pure monoterminal-functional diorganopolysiloxane.

With regard to the method for the preparation of diorganopolysiloxane with the general formula $$R(R_2SiO)_pB$$

in which R is a monovalent hydrocarbon group, p is an integer with a value of at least 1, and B is the hydrogen atom or a group with the general formula $$-SiR_2R^1$$

in which R is a monovalent hydrocarbon group and $R^1$ is the hydrogen atom or an organofunctional group, by first subjecting (A) a cyclic trisiloxane with the general formula $$(R_2SiO)_3$$

in which R is a monovalent hydrocarbon group to nonequilibration polymerization, optionally in the presence of (B) silane or siloxane with the general formula $$R(R_2SiO)_mH$$

in which R is a monovalent hydrocarbon group and m is an integer with a value of at least 1, under the effect of (C) a lithium polymerization catalyst with the general formula $$R(R_2SiO)_nLi$$

in which R is a monovalent hydrocarbon group and n is an integer with a value of at least zero, and subsequently terminating said nonequilibration polymerization with (D) an acid or halosilane with the general formula $$R^1R_2SiX$$

in which R is a monovalent hydrocarbon group, $R^1$ is the hydrogen atom or an organofunctional group, and X is a halogen atom, the preparative method comprising the first invention of the instant application relates to a method for the preparation of diorganopolysiloxane that is characterized in that the silanol-containing impurity present in the aforesaid cyclic trisiloxane (A) is preliminarily silylated with (E) a silylating agent.

With regard to the method for the preparation of diorganopolysiloxane with the general formula $$R(R_2SiO)_pB$$

in which R is a monovalent hydrocarbon group, p is an integer with a value of at least 1, and B is the hydrogen atom or a group with the general formula $$-SiR_2R^1$$

in which R is a monovalent hydrocarbon group and $R^1$ is the hydrogen atom or an organofunctional group, by first subjecting (A) a cyclic trisiloxane with the general formula $$(R_2SiO)_3$$

in which R is a monovalent hydrocarbon group to nonequilibration polymerization, optionally in the presence of (B) a silane or siloxane with the general formula $$R(R_2SiO)_mH$$

in which R is a monovalent hydrocarbon group and m is an integer with a value of at least 1, under the effect of a (C) a lithium polymerization catalyst with the general formula $$R(R_2SiO)_nLi$$

in which R is a monovalent hydrocarbon group and n is an integer with a value of at least zero, and subsequently terminating said nonequilibration polymerization with (D) an acid or halosilane with the general formula $$R^1R_2SiX$$

in which R is a monovalent hydrocarbon group, $R^1$ is the hydrogen atom or an organofunctional group, and X is a halogen atom, the second invention of the instant application relates to a method for the preparation of diorganopolysiloxane that is characterized in that the silanol-containing impurity present in the aforesaid cyclic trisiloxane (A) is preliminarily converted into lithiated material by lithiation with (F) an organolithium compound and said lithiated material is then silylated with (G) a silylating agent that contains silicon-bonded halogen.

These and other features, objects, and advantages, of the present invention will become more apparent from a consideration of the following detailed description thereof.

DETAILED DESCRIPTION OF THE INVENTION

Figure 1:
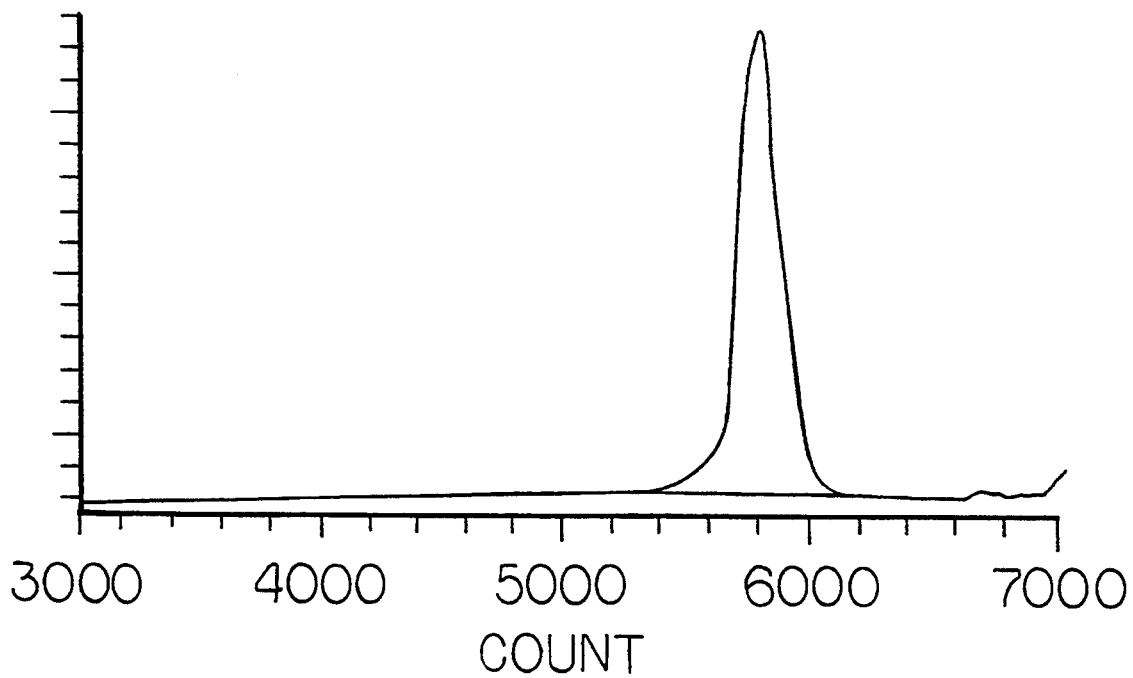
FIG. 1 is a gel permeation chromatogram of the dimethylpolysiloxane synthesized in Example 1.
Figure 2:
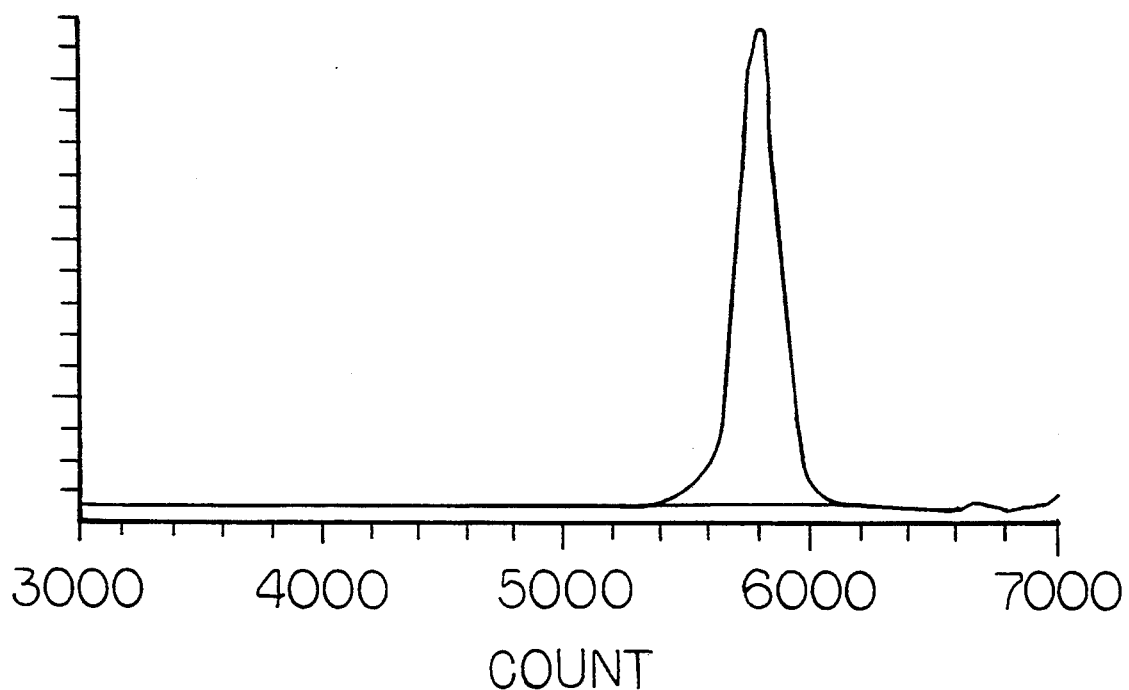
FIG. 2 is a gel permeation chromatogram of the dimethylpolysiloxane synthesized in Example 2.
Figure 3:
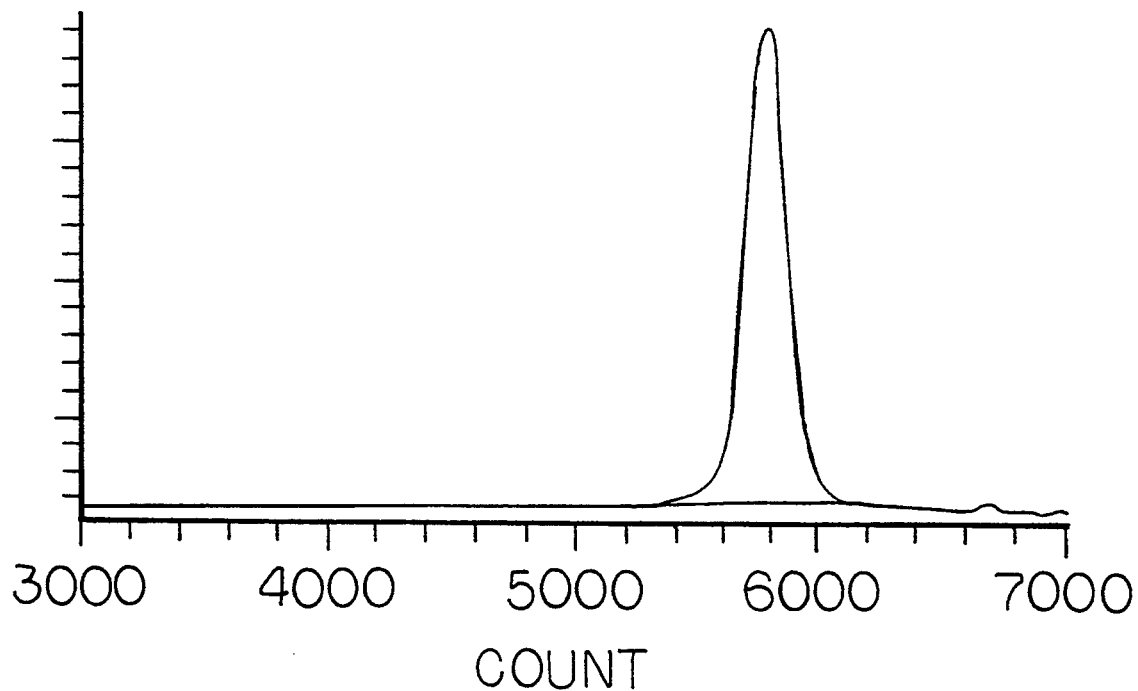
FIG. 3 is a gel permeation chromatogram of the dimethylpolysiloxane synthesized in Example 3.
Figure 4:
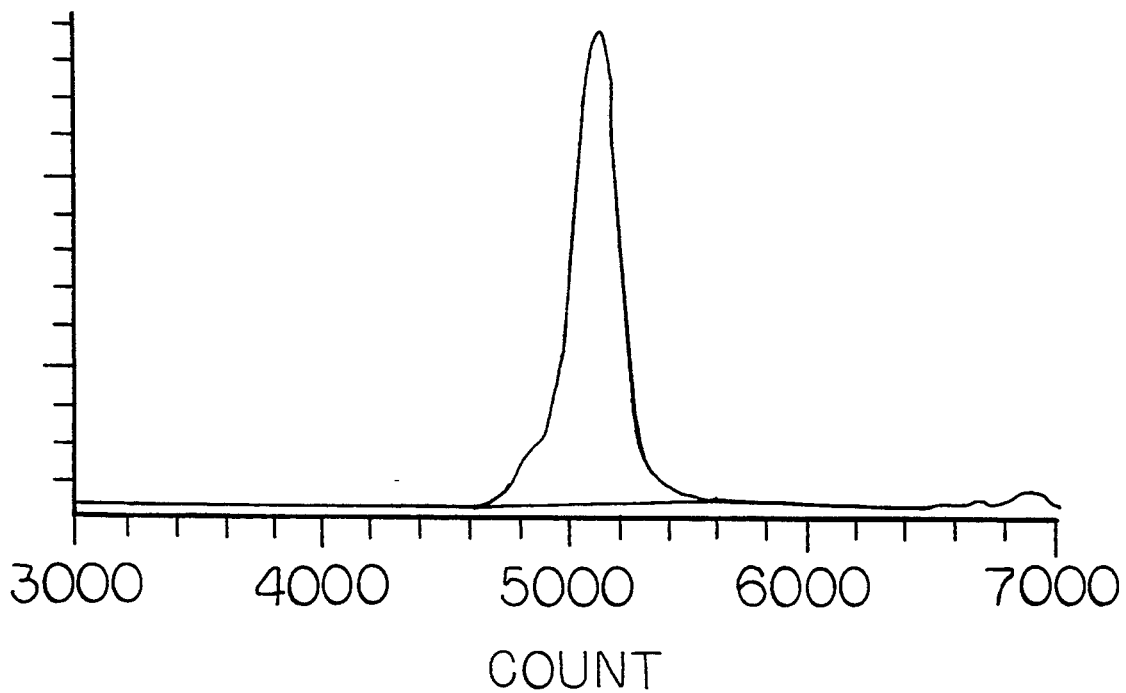
FIG. 4 is a gel permeation chromatogram of the dimethylpolysiloxane synthesized in Example 4.
Figure 5:
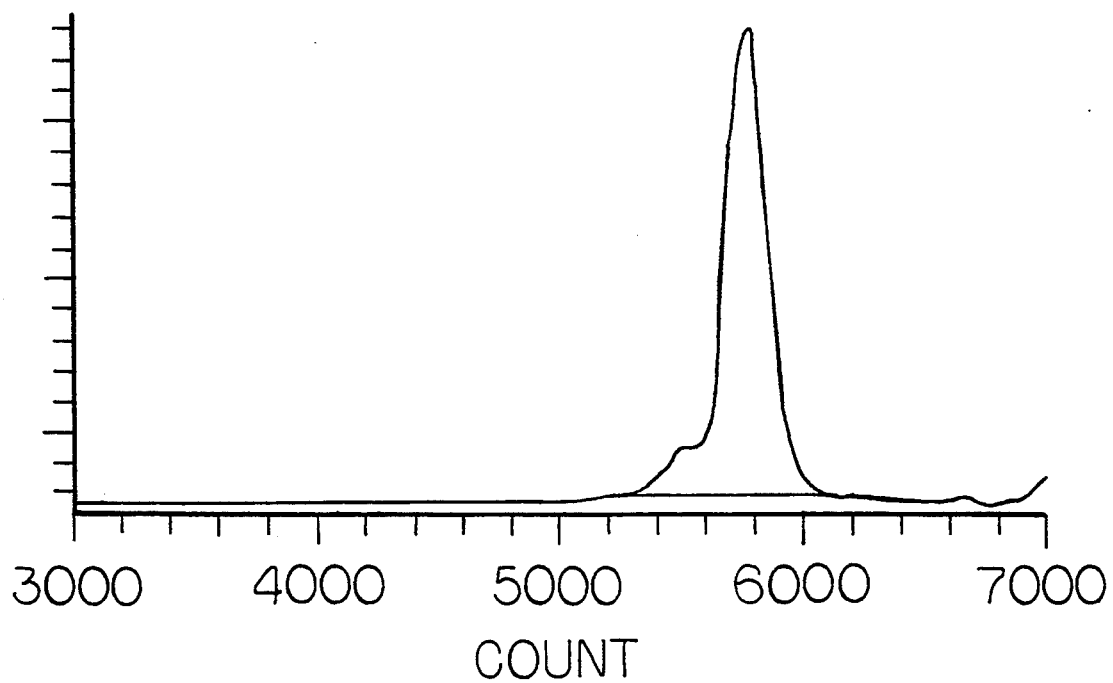
FIG. 5 is a gel permeation chromatogram of the dimethylpolysiloxane synthesized in Example 5.
Figure 6:
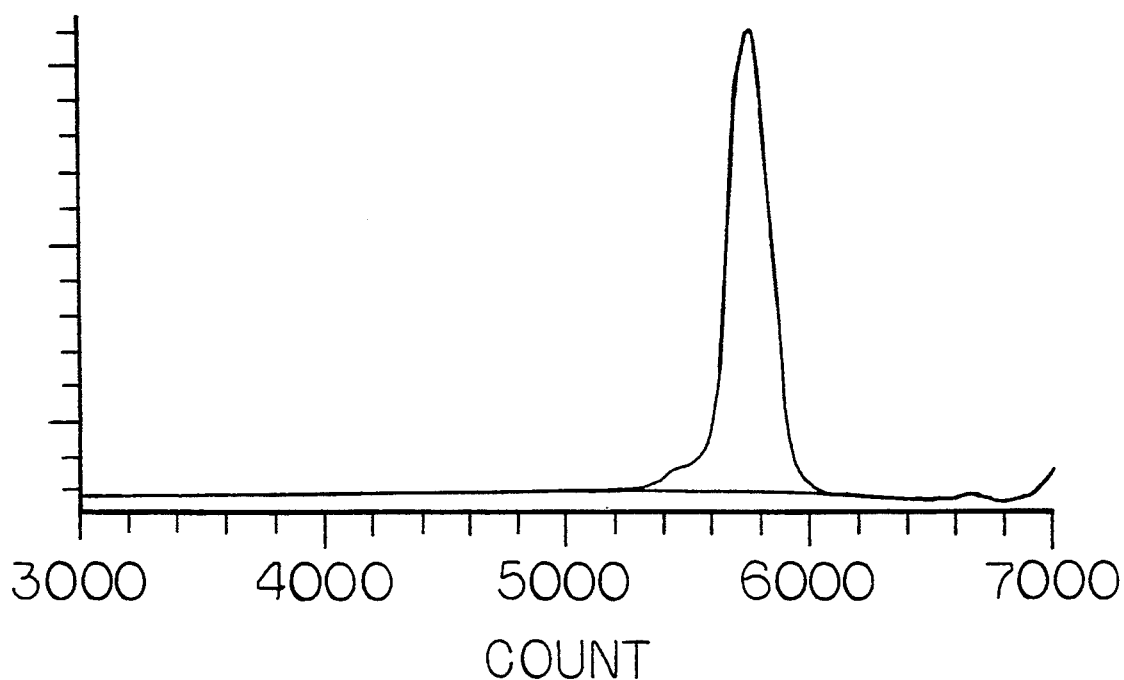
FIG. 6 is a gel permeation chromatogram of the dimethylpolysiloxane synthesized in Example 6.
Figure 7:
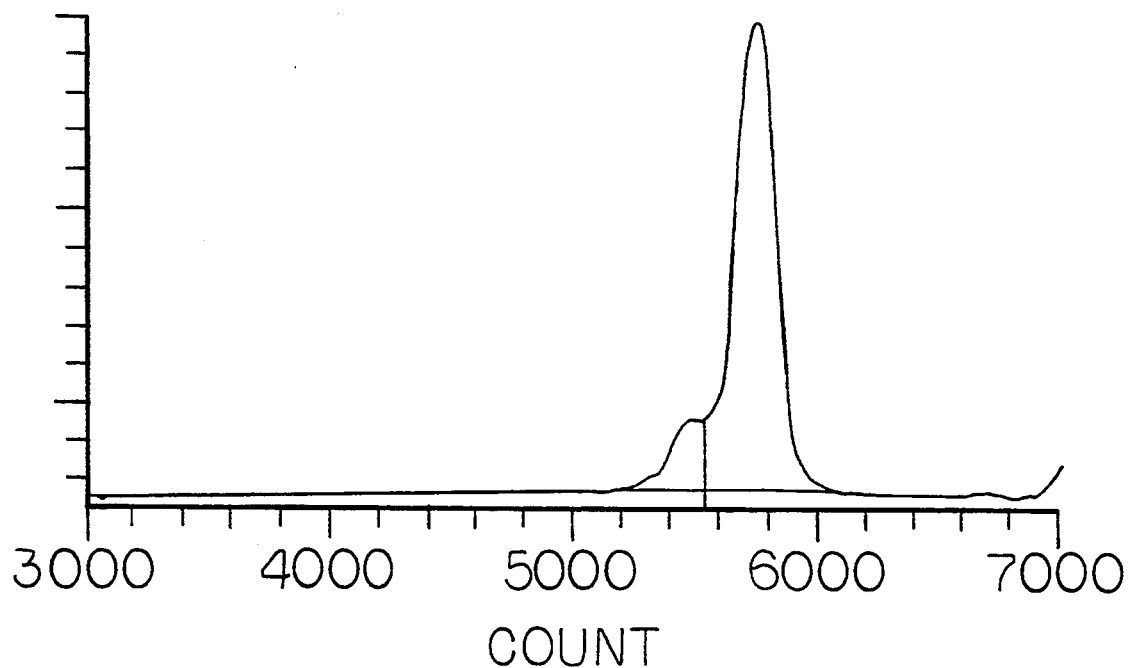
FIG. 7 is a gel permeation chromatogram of the dimethylpolysiloxane synthesized in Comparison Example 1.
Figure 8:
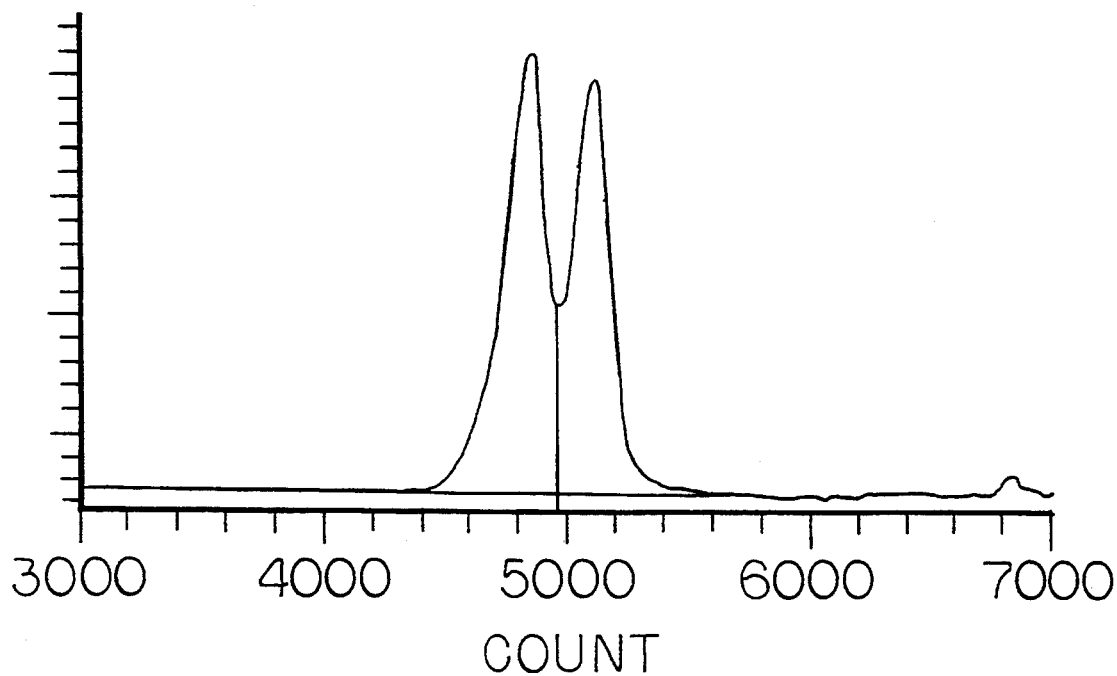
FIG. 8 is a gel permeation chromatogram of the dimethylpolysiloxane synthesized in Comparison Example 2.

The preparative method of the first invention of the instant application will be considered in greater detail first.

Component (A) is the principal starting material in the preparative method of the first invention of the instant application, and it consists of cyclic trisiloxane with the following general formula.

$$(R_2SiO)_3$$

The group R in this general formula represents monovalent hydrocarbon groups, and the monovalent hydrocarbon groups encompassed by R are specifically exemplified by alkyl groups such as methyl, ethyl, propyl, butyl, pentyl, hexyl, heptyl, and octyl; alkenyl groups such as vinyl, allyl, butenyl, pentenyl, hexenyl, and heptenyl; aryl groups such as phenyl, tolyl, xylyl, and naphthyl; and aralkyl groups such as benzyl, and phenethyl. R is preferably methyl, phenyl, or vinyl because this affords ease of handling.

The cyclic trisiloxanes comprising the subject component (A) are specifically exemplified by 1,1,3,3,5,5-hexamethylcyclotrisiloxane, 1,1,3,3,5,5-hexaphenylcyclotrisiloxane, 1,3,5-trimethyl-1,3,5-triphenylcyclotrisiloxane, 1,3,5-trimethyl-1,3,5-trivinylcyclotrisiloxane, 1,3,5-triethyl-1,3,5-trimethylcyclotrisiloxane, 1,1,3,3,5,5-hexavinylcyclotrisiloxane, 1,3,5-trimethyl-1,3,5-tripropylcyclotrisiloxane, and 1,3,5-trimethyl-1,3,5-triphenethylcyclotrisiloxane.

The characteristic feature of the preparative method of the first invention of the instant application consists of the preliminary silylation of the silanol-containing impurity such as a silane, or a siloxane that contains at least 2 silanol groups in the aforesaid component (A) with silylating agent (E) in order thereby to prevent this silanol-containing impurity from participating in the nonequilibration polymerization of component (A), optionally in the presence of silane or siloxane (B), under the effect of lithium polymerization catalyst (C).

The silylating agent comprising the component (E) in the preparative method of the first invention of the instant application silylates the silanol-containing impurity present in component (A), and the nature of component (E) is not specifically restricted. The silylating agent comprising component (E) is exemplified by silylating agents that contain silicon-bonded halogen (SiX-containing silylating agents) and silylating agents that contain silicon-bonded nitrogen (SiN-containing silylating agents). The SiX-containing silylating agents are specifically exemplified by chlorosilanes such as trimethylchlorosilane, dimethyldichlorosilane, phenyldimethylchlorosilane, and tertbutyldimethylchlorosilane, and by bromosilanes such as trimethylbromosilane, and triethylbromosilane. Trimethylchlorosilane is preferred for its ease of acquisition and excellent reactivity. The SiN-containing silylating agents are specifically exemplified by silazanes such as hexamethyldisilazane and so forth; silylamines such as dimethylaminotrimethylsilane, diethylaminotrimethylsilane, and trimethylsilylimidazole and silylamides such as bis(trimethylsilyl)acetamide; trimethylsilyldiphenylurea; and bis(trimethylsilyl)urea. Hexamethyldisilazane is preferred for its ease of acquisition and economics.

The subject silylation reaction produces hydrogen halide as by-product when SiX-containing silylating agent is used as component (E) in the preparative method of the first invention of the instant application. Because this hydrogen halide can open the ring in component (A) to produce silanol-containing impurity, the hydrogen halide produced as by-product in the subject silylation reaction is preferably removed from the system. A hydrogen halide binding agent, such as an organic amine compound, or ammonia, is preferably added to this silylation reaction in order to remove the hydrogen halide from the system. No particular restrictions apply to the operable organic amine compounds, which are specifically exemplified by tertiary organic amine compounds such as trimethylamine, triethylamine, tributylamine, and pyridine. When SiN-containing silylating agent is used as component (E), ammonium chloride, ammonium sulfate, or SiX-containing silylating agent can be simultaneously added in order to increase the reactivity of the silylating agent. The co-use of SiX-containing silylating agent and SiN-containing silylating agent as component (E) is particularly preferred because this serves both to remove the hydrogen halide by-product of the silylation reaction from the system and improve the reactivity of the SiN-containing silylating agent.

Component (E) is preferably added in the preparative method of the first invention of the instant application in a quantity that provides at least the stoichiometric quantity of silicon-bonded halogen and/or silicon-bonded nitrogen in component (E) with reference to the silanol group in the silanol-containing impurity in component (A). However, SiX-containing silylating agents can participate in a neutralization reaction with the subsequently added component (C) and can thereby inactivate component (C). In addition, when added in excess, a very active silylating agent such as a silylamide, can also silylate the silanol group in the subsequently added component (B), which then leads to an increase in the molecular weight of the final diorganopolysiloxane product. For these reasons, these silylating agents are preferably added in equivalent quantities. The silanol group content due to the silanol-containing impurity in component (A) can be determined in advance using analytical instruments such as a Fourier-transform infrared spectrophotometer and so forth. When SiX-containing silylating agent is used as component (E), the hydrogen halide binding agent, such as an organic amine compound, or ammonia, is preferably added in a quantity at least equivalent to that of said silylating agent.

No particular restrictions obtain on the conditions for running the silylation reaction in the preparative method of the first invention of the instant application. For example, the reaction temperature ranges from room temperature to the boiling point of the solvent used. While the subject silylation reaction can be run in the absence of solvent, this reaction is preferably run in aprotic solvent. Usable aprotic solvents are specifically exemplified by aromatic solvents such as benzene, toluene, and xylene; aliphatic solvents such as hexane, heptane, and cyclohexane; ether solvents such as tetrahydrofuran, and diethyl ether; ketone solvents such as acetone, and methyl ethyl ketone; ester solvents such as ethyl acetate, and butyl acetate; dimethylformamide; acetonitrile; and dimethyl sulfoxide. These aprotic solvents are preferably thoroughly dried prior to use.

Component (B) is an optional starting material in the preparative method of the first invention of the instant application. Its function is to regulate or adjust the molecular weight of the diorganopolysiloxane product. Component (B) is silane or siloxane with the following general formula.

The group R in the preceding formula represents monovalent hydrocarbon groups, and the monovalent hydrocarbon groups encompassed by R are specifically exemplified by alkyl groups such as methyl, ethyl, propyl, butyl, pentyl, hexyl, heptyl, and octyl; alkenyl groups such as vinyl, allyl, butenyl, pentenyl, hexenyl, and heptenyl; aryl groups such as phenyl, tolyl, xylyl, and naphthyl; and aralkyl groups such as benzyl, and phenethyl. R is preferably methyl, phenyl, or vinyl because this affords ease of handling. The subscript m in the preceding formula is an integer with a value of at least 1 and preferably is an integer with a value of 1 to 20.

The silanes and siloxanes comprising component (B) are specifically exemplified by silanes such as trimethylsilanol, dimethylvinylsilanol, dimethylphenylsilanol, and triphenylsilanol; and by siloxanes such as dimethylpolysiloxane endblocked at one molecular chain terminal by the hydroxydimethylsiloxy group and endblocked at the other molecular chain terminal by the trimethylsiloxy group, dimethylsiloxane oligomer endblocked at one molecular chain terminal by the hydroxydimethylsiloxy group and endblocked at the other molecular chain terminal by the trimethylsiloxy group, methylphenylpolysiloxane endblocked at one molecular chain terminal by the hydroxydimethylsiloxy group and endblocked at the other molecular chain terminal by the trimethylsiloxy group, methylphenylsiloxane oligomer endblocked at one molecular chain terminal by the hydroxydimethylsiloxy group and endblocked at the other molecular chain terminal by the trimethylsiloxy group, methylphenylpolysiloxane endblocked at one molecular chain terminal by the hydroxydiphenylsiloxy group and endblocked at the other molecular chain terminal by the trimethylsiloxy group, methylphenylpolysiloxane endblocked at one molecular chain terminal by the hydroxydimethylsiloxy group and endblocked at the other molecular chain terminal by the dimethylvinylsiloxy group, methylphenylsiloxane-methylvinylsiloxane copolymer endblocked at one molecular chain terminal by the hydroxydimethylsiloxy group and endblocked at the other molecular chain terminal by the trimethylsiloxy group, and methylphenylsiloxane-diphenylsiloxane copolymer endblocked at one molecular chain terminal by the hydroxydimethylsiloxy group and endblocked at the other molecular chain terminal by the trimethylsiloxy group.

Methods for the synthesis of component (B) are already known. A specific example of this synthesis consists of the careful hydrolysis in dilute aqueous base solution of organomonochlorosilane or diorganopolysiloxane having Si-bonded halogen at only one molecular chain terminal.

The lithium polymerization catalyst comprising component (C) in the preparative method of the first invention of the instant application is a catalyst of the nonequilibration polymerization of component (A) or component (A) plus component (B). The lithium polymerization catalyst comprising component (C) has the following general formula.

R(R$_2$SiO)$_n$Li

The group R in the preceding formula represents monovalent hydrocarbon groups, and the monovalent hydrocarbon groups encompassed by R are specifically exemplified by alkyl groups such as methyl, ethyl, propyl, butyl, pentyl, hexyl, heptyl, and octyl; alkenyl groups such as vinyl, allyl, butenyl, pentenyl, hexenyl, and heptenyl; aryl groups such as phenyl, tolyl, xylyl, and naphthyl; and aralkyl groups such as benzyl, and phenethyl. R is preferably methyl, phenyl, or vinyl because this affords ease of handling. The subscript n in the preceding formula is an integer with a value of at least zero and preferably is an integer with a value of zero to 20. When n=zero, component (C) consists of organolithium compounds that are available on a commercial basis. On the other hand, component (C) is the lithium salt of organosilane or diorganopolysiloxane when n is an integer with a value of at least 1, and in this case it can be prepared by the addition of a commercially available organolithium compound to hydroxydiorganosilane (such as described above for component (B)) or diorganopolysiloxane endblocked by the hydroxydiorganosiloxy group at only the one molecular chain terminal (also such as described above for component (B)).

The lithium polymerization catalyst comprising component (C) is specifically exemplified by alkyllithiums such as n-butyllithium, sec-butyllithium, tert-butyllithium, and methyllithium; aryllithiums such as phenyllithium, and xylyllithium; alkenyllithiums such as vinyllithium, and allyllithium; the lithium salts of organosilane such as lithium trimethylsilanolate, lithium dimethylvinylsilanolate, and lithium triphenylsilanolate; and the lithium salts of organosiloxanes. The preceding alkyl-, aryl-, and alkenyllithiums and also lithium amides such as lithium bis(diisopropyl)amide are examples of commercially available organolithium compounds usable for the synthesis of the lithium salts of organosilane and lithium salts of organopolysiloxane.

No specific restrictions apply to the quantity of addition of component (C) in the preparative method of the first invention of the instant application, and this component may simply be added in a quantity sufficient to run the nonequilibration polymerization. When SiX-containing silylating agent has been used as the component (E) for silylation of the silanol-containing impurity in component (A), both the unreacted silylating agent itself and the salt from the hydrogen halide by-product and organic amine or ammonia will participate in a neutralization reaction with component (C) and thereby inactivate component (C). One of the following is preferably carried out in order to respond to this: (i) addition of component (C) in excess of the quantity equivalent to the preceding, (ii) filtration of the salt by-product and then addition of component (C) in excess of the quantity equivalent to the aforesaid silylating agent remaining in the system, or (iii) preliminary elimination of both from the system. As a result, quantities are preferred that yield values of 100 : 0 to 0.01 : 100 for the ratio between the number of moles of lithium polymerization catalyst in component (C) that effectively acts in the nonequilibration polymerization and the number of moles of component (B) or silane or siloxane having silanol at only one molecular chain terminal that is produced as the nonequilibration polymerization develops. Quantities that yield values of 0.5 : 99.5 to 50 : 50 are particularly preferred because they provide excellent nonequilibration polymerization reaction rates, excellent production efficiencies, and efficient utilization of the expensive lithium polymerization catalyst.

The reaction temperature and reaction time for the nonequilibration polymerization of component (A) and optionally component (B) under the effect of component (C) are not specifically restricted in the preparative method of the first invention of the instant application; however, very careful control must be exercised in order to avoid causing equilibration polymerization reactions (redistribution reactions). The occurrence of equilibration polymerization reactions leads to the secondary production of large amounts of diterminal-functional diorganopolysiloxane. In specific terms, when 1,1,3,3,5,5-hexamethylcyclotrisiloxane is used as component (A), the nonequilibration polymerization reaction conditions preferably consist of reaction for 1 to 50 hours at temperatures of 0° C. to 30° C. While the subject nonequilibration polymerization can be run in the absence of solvent, it is preferably run in aprotic solvent. Aprotic solvents usable in this reaction are exemplified by the same solvents as above, and the aprotic solvent used in the silylation reaction is preferably used in the nonequilibration polymerization as long as no specific problems occur. The use of combinations of 2 or more aprotic solvents often yields good results. For example, when a low-polarity aprotic solvent such as toluene is used, it is preferably combined with a high-polarity aprotic solvent, such as dimethylformamide or dimethyl sulfoxide, in order to accelerate the nonequilibration polymerization.

The development of the nonequilibration polymerization in the preparative method of the first invention of the instant application can generally be monitored by determining the decline in the quantity of component (A) by an analytical technique such as gas chromatography and so forth. When the component (A) conversion has reached a prescribed value, the nonequilibration polymerization is preferably terminated by the addition of component (D). While it will be necessary to control the component (A) conversion in accordance with the type of component (A) and type of diorganopolysiloxane product, the component conversion is generally 70% to 100% and preferably is 80% to 95%.

Moisture present in the starting material and aprotic solvent must be removed to the maximum extent possible in the execution of the subject nonequilibration polymerization reaction. The presence of moisture in the starting material or aprotic solvent results in a pronounced tendency for diterminal-functional diorganopolysiloxane to be produced as by-product.

The number-average molecular weight of the diorganopolysiloxane product is determined in the preparative method of the first invention of the instant application by the ratio between the components (B) and (C) present in the system at the time of polymerization and the component (A) consumption.

Component (D) terminates the nonequilibration polymerization in the preparative method of the first invention of the instant application, and it consists of acid or halosilane with the following general formula.

$R^1R_2SiX$ 

Component (D) encompasses any acid that reacts with the produced lithium silanolate to yield a stable lithium salt, and such acids are specifically exemplified by carbonic acid; mineral acids such as hydrochloric acid, and sulfuric acid; and carboxylic acids such as acetic acid, propionic acid, and acrylic acid. The halosilanes encompassed by component (D) are specifically exemplified by dimethylchlorosilane, dimethylvinylchlorosilane, methacryloxypropyldimethylchlorosilane, and chloropropyldimethylchlorosilane.

Termination of the nonequilibration polymerization in the preparative method of the first invention of the instant application using an acid such as carbonic acid, mineral acid, or carboxylic acid as component (D) places the silanol group at one terminal of the molecular chain of the diorganopolysiloxane product. When this nonequilibration polymerization is terminated using the above-described halosilane as component (D), the endblocking group then consists of the silyl residue yielded by removal of the halogen from the halosilane used. As a result, acid should be employed as component (D) when the synthesis is desired of diorganopolysiloxane having the silanol group at only one molecular chain terminal (silanol-monoterminated), while functional group-containing halosilane should be used when the synthesis is desired of diorganopolysiloxane having said functional group at only one molecular chain terminal. In addition, diorganopolysiloxane having a functional group at only one molecular chain terminal can be synthesized by reacting a component (D) functional group-containing halosilane or a functional group-containing silazane with the silanol-monoterminated diorganopolysiloxane afforded by the use of acid as component (D). A hydrogen halide binding agent, such as organic amine, or ammonia, is preferably added when halosilane is used as component (D) or when the silanol-monoterminated diorganopolysiloxane is reacted with halosilane. Moreover, diorganopolysiloxane having SiH at only one molecular chain terminal can be prepared through the use of SiH-containing halosilane as component (D), for example dimethylchlorosilane. This SiH-monoterminated diorganopolysiloxane can then be addition reacted with a functional group-containing alkenyl compound, such as allyl glycidyl ether, allylamine, allyl alcohol, trimethylolpropane monoallyl ether, glycerol monoallyl ether, and allyl methacrylate, in the presence of a hydrosilylation-reaction catalyst, such as a platinum group metal catalyst, to provide a diorganopolysiloxane having a functional group at only one molecular chain terminal. If necessary, the functional group can be protected in this addition reaction through the use of a protective group such as the trimethylsilyl group, which may then be removed after the addition reaction.

The diorganopolysiloxane prepared as described above has the following general formula.

$R(R_2SiO)_pB$ 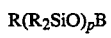

The group R in this general formula represents monovalent hydrocarbon groups, and the monovalent hydrocarbon groups encompassed by R are specifically exemplified by alkyl groups such as methyl, ethyl, propyl, butyl, pentyl, hexyl, heptyl, and octyl; alkenyl groups such as vinyl, allyl, butenyl, pentenyl, hexenyl, and heptenyl; aryl groups such as phenyl, tolyl, xylyl, and naphthyl; and aralkyl groups such as benzyl, and phenethyl. The group B in the preceding formula is the hydrogen atom a group with the following general formula.

$-SiR_2R^1$ 

The group R in the preceding formula is a monovalent hydrocarbon group, and it is exemplified by the same groups as above. $R^1$ is the hydrogen atom or an organofunctional group. The organofunctional groups encompassed by $R^1$ are specifically exemplified by alkenyl groups such as vinyl, allyl, butenyl, pentenyl, hexenyl, and heptenyl; and by 3-methacryloxypropyl, 3-acryloxypropyl, 3-chloropropyl, 3-glycidoxypropyl, 3-aminopropyl, and 3-hydroxypropyl. The subscript p in the preceding formula is an integer with a value of at least 1, preferably at least 3, and more preferably at least 10.

The preparative method of the second invention of the instant application will now be considered in detail.

The components (A)–(D) in the preparative method of the second invention of the instant application are the same as described above for the first invention of the instant application. The characteristic feature of the preparative method of the second invention of the instant application consists of the preliminary lithiation of the silanol-containing impurity in the aforesaid component (A) with an organolithium compound (F) to form lithiated material and the subsequent silylation of this lithiated material with silylating agent that contains silicon-bonded halogen (G), in order thereby to prevent this silanol-containing impurity from participating in the nonequilibration polymerization of component (A), optionally in the presence of silane or siloxane (B), under the effect of lithium polymerization catalyst (C). The preparative method of the second invention of the instant application prevents participation by the silanol-containing impurity in the nonequilibration polymerization more effectively than does the preparative method of the first invention of the instant application.

The organolithium compound comprising component (F) in the preparative method of the second invention of the instant application is an organolithium compound that lithiates the silanol-containing impurity present in component (A). The organolithium compound comprising component (F) is not specifically restricted, and commercially available organolithium compounds can be employed.

The lithium compounds encompassed by component (F) are specifically exemplified by alkyllithiums such as n-butyllithium, sec-butyllithium, tert-butyllithium, and methyllithium; aryllithiums such as phenyllithium, and xylyllithium; alkenyllithiums such as vinyllithium, and allyllithium; and lithium amides such as lithium bis(diisopropyl)amide.

Lithiation of the silanol-containing impurity in component (A) by component (F) in the preparative method of the second invention of the instant application proceeds readily at room temperature or below. Component (F) is preferably added in at least a stoichiometric quantity with reference to the silanol group in the silanol-containing impurity in component (A). This lithiation reaction can be run in the absence of solvent, but is preferably run in aprotic solvent. Aprotic solvents usable in this case are exemplified by the same solvents as above.

The aforesaid lithiated material is subsequently silylated with silylating agent that contains silicon-bonded halogen (G) (SiX-containing silylating agent) in the preparative method of the second invention of the instant application. The SiX-containing silylating agents encompassed by component (G) are specifically exemplified by chlorosilanes such as trimethylchlorosilane, dimethyldichlorosilane, phenyldimethylchlorosilane, and tert-butyldimethylchlorosilane; and by bromosilanes such as trimethylbromosilane, and triethylbromosilane. Trimethylchlorosilane is preferred for its ease of acquisition and excellent reactivity.

Component (G) is preferably added in the preparative method of the second invention of the instant application in at least a stoichiometric quantity with reference to the silanol group in the silanol-containing impurity in component (A). An advantage to the preparative method of the second invention of the instant application is that the use of component (G) at less than equivalency relative to the previously added component (F) makes it unnecessary for the ensuing nonequilibration polymerization to also add the component (C) lithium polymerization catalyst functioning as nonequilibration polymerization catalyst. This silylating reaction can be run in the absence of solvent, but is preferably run in aprotic solvent. Aprotic solvents usable in this case are exemplified by the same solvents as above.

The conditions for this silylating reaction cannot be spoken of in unconditional terms because these conditions vary as a function of the reactivity of the silylating agent used. However, the reaction is ordinarily run at a temperature between room temperature and the boiling point of the solvent used. The quantity of silanol group impurity in the cyclic trisiloxane is preferably measured beforehand by a technique such as Fourier-transform infrared spectrochemical analysis (FT-IR) in order to determine the amount of silylating agent to be used.

It has been reported in the Journal of Organic Chemistry, Volume 35, 1309 (1970) that the cyclic trisiloxane ring is readily opened at room temperature with the production of lithium silanolate when an organolithium compound is added to cyclic trisiloxane. However, in the case of the second invention of the instant application, it has been confirmed that the addition of component (F) preferentially converts the silanol-containing impurity in component (A) to lithiated material and that this lithiated material is selectively silylated by the subsequent addition of component (G). It has also been confirmed that this method yields a more complete silylation of the silanol-containing impurity than the direct reaction of silylating agent with the silanol-containing impurity in component (A).

As discussed hereinbefore, the monoterminal-functional diorganopolysiloxane afforded by the preparative method of the present invention contains little diterminal-functional diorganopolysiloxane by-product. As a result, when it is used as starting material for graft organic polymer, it can donate to the graft organic polymer the lubricity, weather resistance, moisture resistance, and gas permeability, that are characteristic of diorganopolysiloxanes without a substantial increase in the viscosity of the graft organic polymer.

The method of the present invention for the preparation of diorganopolysiloxane is explained in greater detail through working examples. The number-average molecular weight and the dispersity reported in the examples for the diorganopolysiloxane were measured by gel permeation chromatography calibrated with dimethylpolysiloxane standard. The trimethylsilanol and dimethylformamide used in the examples were dried before use.

EXAMPLE 1

90 g toluene was mixed with 110 g (494.5 mmol) 1,1,3,3,5,5-hexamethylcyclotrisiloxane that contained 170 ppm silanol group (SiOH group=1.1 mmol) as determined using a Fourier-transform infrared spectrophotometer (FT-IR). The system was then azeotropically dried for 1 hour. After the system had been cooled to room temperature, 0.8 mL of a 1.62 N hexane solution of n-butyllithium (1.29 mmol n-butyllithium) was added, and the system was stirred for 10 minutes at room temperature. 0.120 g (1.1 mmol) trimethylchlorosilane was subsequently added to the system with stirring for 30 minutes at room temperature. This was followed by the addition of a mixture of 0.816 g (9.05 mmol) trimethylsilanol and 4.4 g dimethylformamide. The 1,1,3,3,5,5-hexamethylcyclotrisiloxane conversion was monitored by gas chromatography (GLC). After 7 hours, this conversion had reached 78.9%, and 0.06 g acetic acid was added to the system at this point in order to terminate the nonequilibration polymerization reaction. The salt product was filtered off, and the filtrate was distilled in a vacuum to afford dimethylpolysiloxane having silanol at only one molecular chain terminal. Analysis of this dimethylpolysiloxane by gel permeation chromatography (GPC) yielded the following results: number-average molecular weight=11,685, dispersity=1.07. No peaks were observed other than the main peak.

EXAMPLE 2

A nonequilibration polymerization reaction was run as in Example 1, but in this case using 3.24 mmol n-butyllithium and 3.05 mmol trimethylchlorosilane. After 5.5 hours, the 1,1,3,3,5,5-hexamethylcyclotrisiloxane conversion had reached 77.7%, and the nonequilibration polymerization reaction was terminated at this point by the procedure in Example 1. The same workup as before afforded dimethylpolysiloxane having silanol at only one molecular chain terminal. Analysis of this dimethylpolysiloxane by GPC yielded the following results: number-average molecular weight=10,544, dispersity=1.07. No peaks were observed other than the main peak.

EXAMPLE 3

A nonequilibration polymerization reaction was run as in Example 1, but in this case using 0.062 g (0.69 mmol) trimethylsilanol. After 5.5 hours, the 1,1,3,3,5,5-hexamethylcyclotrisiloxane conversion had reached 79.4%, and the nonequilibration polymerization reaction was terminated at this point by the procedure in Example 1. The same workup as before afforded dimethylpolysiloxane having silanol at only one molecular chain terminal. Analysis of this dimethylpolysiloxane by GPC yielded the following results: number-average molecular weight=51,954 based on standard polystyrene, dispersity=1.07. No peaks were observed other than the main peak.

EXAMPLE 4

1,800 g toluene was mixed with 2,200 g (9,889.2 mmol) 1,1,3,3,5,5-hexamethylcyclotrisiloxane that contained 170 ppm silanol group (SiOH group=22.0 mmol) as determined by FT-IR. The system was then azeotropically dried for 1 hour. After the system had been cooled to room temperature, 40.0 mL of a 1.63 N hexane solution of n-butyllithium (65.2 mmol) was added, and the system was stirred for 15 minutes at room temperature. 6.67 g (61.4 mmol) trimethylchlorosilane was subsequently added to the system with stirring for 10 minutes at room temperature. This was followed by the addition of a mixture of 16.33 g (181.0 mmol) trimethylsilanol and 88 g dimethylformamide. The 1,1,3,3,5,5-hexamethylcyclotrisiloxane conversion was monitored by GLC. After 5.5 hours, this conversion had reached 80.2%, and 1.2 g acetic acid was added to the system at this point in order to terminate the nonequilibration polymerization reaction. The salt product was filtered off, and the filtrate was distilled in a vacuum to afford dimethylpolysiloxane having silanol at only one molecular chain terminal (silanol-monoterminated dimethylpolysiloxane). Analysis of this dimethylpolysiloxane by GPC yielded the following results: number-average molecular weight=10,707, dispersity=1.08. Peaking other than the main peak was almost absent.

EXAMPLE 5

12 g of the silanol-monoterminated dimethylpolysiloxane synthesized in Example 4, 7.2 g tetramethyldisilazane, 30 g diethyl ether, and 0.1 g trifluoroacetic acid were mixed, and the mixture was held for 4 hours at room temperature. The system was then heated under reduced pressure to yield dimethylpolysiloxane having silicon-bonded hydrogen at only the one molecular chain terminal. Absorption due to the silanol group was not observed when this dimethylpolysiloxane was analyzed by FT-IR, which confirmed completion of the endblocking reaction. The SiH content of this dimethylpolysiloxane as determined by iodometry was 0.0106 weight %, which was in good agreement with the value of 0.0103 weight % calculated from the material charged. This value gave a value of 0.180 weight % for the silanol group content in the silanol-monoterminated dimethylpolysiloxane prior to the endblocking reaction, which again was in good agreement with the value of 0.176 weight % calculated from the material charged.

EXAMPLE 6

50 g (5.29 mmol) of the silanol-monoterminated dimethylpolysiloxane synthesized in Example 4, 50 mL toluene, and 0.70 g (9.53 mmol) diethylamine were mixed, and 1.216 g (5.51 mmol) methacryloxypropyldimethylchlorosilane was then dripped into this mixture at room temperature. After the completion of addition, the system was stirred while heating at 60° C. for 7.5 hours. The system was subsequently cooled to room temperature, the salt product was filtered off, and the filtrate was distilled under reduced pressure to yield dimethylpolysiloxane having the 3-methacryloxypropyl group at only one molecular chain terminal. Analysis of this dimethylpolysiloxane by GPC gave the following results: number-average molecular weight=11,544, dispersity=1.07. No peaks other than the main peak were observed. This dimethylpolysiloxane did not produce silanol group signals when analyzed by $^{29}Si$ nuclear magnetic resonance spectroscopic analysis, which confirmed completion of the endblocking reaction.

EXAMPLE 7

90 g toluene was mixed with 110 g (494.5 mmol) 1,1,3,3,5,5-hexamethylcyclotrisiloxane that contained 170 ppm silanol group (SiOH group=1.1 mmol) as determined by FT-IR. The system was then azeotropically dried for 1 hour. After the system had been cooled to room temperature, 0.22 g (2.2 mmol) triethylamine and then 0.141 g (1.3 mmol) trimethylchlorosilane were added and stirring was carried out for 1 hour at room temperature. This was followed by the addition of 0.816 g (9.05 mmol) trimethylsilanol to the system, and stirring for 1 hour at room temperature. The salt product was subsequently filtered off, azeotropic drying was carried out for 30 minutes, and the system was again cooled to room temperature. This was followed by the introduction of 0.1 mL of a 1.62 N hexane solution of n-butyllithium (0.162 mmol) and stirring for 10 minutes at room temperature. 4.4 g dimethylformamide was then added to the system, and stirring was carried out for 7.5 hours at 30° C. When the 1,1,3,3,5,5-hexamethylcyclotrisiloxane conversion according to GLC had reached 79.3%, 0.06 g acetic acid was added to the system in order to terminate the nonequilibration polymerization reaction. The salt product was filtered off, and the filtrate was distilled in a vacuum to afford dimethylpolysiloxane having silanol at only one molecular chain terminal. Analysis of this dimethylpolysiloxane by GPC yielded the following results: number-average molecular weight=11,210, dispersity=1.10. Peaking other than the main peak was almost absent.

EXAMPLE 8

90 g toluene was mixed with 110 g (494.5 mmol) 1,1,3,3,5,5-hexamethylcyclotrisiloxane that contained 170 ppm silanol group (SiOH group=1.1 mmol) as determined by FT-IR. The system was then azeotropically dried for 1 hour. After the system had been cooled to room temperature, 0.235 g (1.46 mmol) hexamethyldisilazane and then 0.0351 g (0.32 mmol) trimethylchlorosilane were added, and heating under reflux was carried out for 8 hours. After the system had again been cooled to room temperature, 0.816 g (9.05 mmol) trimethylsilanol and then 0.3 mL of a 1.62 N hexane solution of n-butyllithium (0.49 mmol) were added, and the system was stirred for 10 minutes at room temperature. 4.4 g dimethylformamide was then added to the system, and stirring was carried out for 5.5 hours at room temperature. When the 1,1,3,3,5,5-hexamethylcyclotrisiloxane conversion according to GLC had reached 79.5%, 0.06 g acetic acid was added to the system in order to terminate the nonequilibration polymerization reaction. The salt product was filtered off, and the filtrate was distilled in a vacuum to afford dimethylpolysiloxane having silanol at only one molecular chain terminal. Analysis of this dimethylpolysiloxane by GPC yielded the following results: number-average molecular weight=11,304, dispersity=1.09. Peaking other than the main peak was almost absent.

Comparison Example 1

90 g toluene and 0.816 g (9.05 mmol) trimethylsilanol were mixed with 110 g (494.5 mmol) 1,1,3,3,5,5-hexamethylcyclotrisiloxane that contained 170 ppm silanol group (SiOH group=1.1 mmol) as determined by FT-IR. This system was azeotropically dried for 1 hour. After the system had been cooled to room temperature, 0.05 mL of a 1.62 N hexane solution of n-butyllithium (0.08 mmol) was added, and stirring was carried out for 10 minutes at room temperature. 3.3 g dimethylformamide was added to the system, which was then stirred for 7.5 hours at room temperature. When the 1,1,3,3,5,5-hexamethylcyclotrisiloxane conversion according to GLC had reached 79.6%, 0.06 g acetic acid was added to the system in order to terminate the nonequilibration polymerization reaction. The salt product was filtered off, and the filtrate was distilled in a vacuum to afford dimethylpolysiloxane having silanol at only one molecular chain terminal. A bimodal molecular weight distribution was found when this dimethylpolysiloxane was analyzed by GPC. For the peak on the higher molecular weight side the number-average molecular weight was 25,995 and the dispersity was 1.03. For the peak on the lower molecular weight side the number-average molecular weight was 11,958 and the dispersity was 1.06. The peak area ratio (former: latter) was 11 : 89.

Comparison Example 2

A nonequilibration polymerization reaction was run as in Comparison Example 1, but in this case using 0.16 mmol n-butyllithium, 0.062 g (0.69 mmol) trimethylsilanol, and 4.4 g dimethylformamide. When the 1,1,3,3,5,5-hexamethylcyclotrisiloxane conversion had reached 80.1% after stirring at room temperature for 4.5 hours, the nonequilibration polymerization reaction was terminated as in Comparison Example 1. Workup as in Comparison Example 1 afforded dimethylpolysiloxane having the silanol group at only one molecular chain terminal. A bimodal molecular weight distribution was found when this dimethylpolysiloxane was analyzed by GPC. For the peak on the higher molecular weight side the number-average molecular weight was 95,712 (standard polystyrene basis) and the dispersity was 1.05. For the peak on the lower molecular weight side the number-average molecular weight was 50,143 (standard polystyrene basis) and the dispersity was 1.04. The peak area ratio (former : latter) was 57 : 43.

EXAMPLE 9

1,800 g toluene was mixed with 2,200 g (9,889.2 mmol) 1,1,3,3,5,5-hexamethylcyclotrisiloxane that contained 170 ppm silanol group (SiOH group=22.0 mmol) as determined by FT-IR. The system was then azeotropically dried for 1 hour. After the system had been cooled to room temperature, 40.0 mL of a 1.63 N hexane solution of n-butyllithium (65.2 mmol) was added, and the system was stirred for 15 minutes at room temperature. 6.67 g (61.4 mmol) trimethylchlorosilane was subsequently added to the system with stirring for 10 minutes at room temperature. This was followed by the addition of a mixture of 16.33 g (181.0 mmol) trimethylsilanol and 88 g dimethylformamide. The 1,1,3,3,5,5-hexamethylcyclotrisiloxane conversion was monitored by GLC. After 5.5 hours, this conversion had reached 80.2%, and 21.0 g (221.8 mmol) dimethylchlorosilane and 33.7 g (332.7 mmol) triethylamine were added to the system at this point. The nonequilibration polymerization was terminated by stirring at room temperature overnight. The salt product was filtered off, and the filtrate was distilled in a vacuum to afford dimethylpolysiloxane having silicon-bonded hydrogen at only one molecular chain terminal. Analysis of this dimethylpolysiloxane by GPC yielded the following results: number-average molecular weight=10,770, dispersity=1.08. No peaks were observed other than the main peak. No silanol group absorption was observed when this dimethylpolysiloxane was analyzed by FT-IR. The silicon-bonded hydrogen content of this dimethylpolysiloxane was 0.0105 weight % as determined by iodometry.

EXAMPLE 10

1,800 g toluene was mixed with 2,200 g (9,889.2 mmol) 1,1,3,3,5,5-hexamethylcyclotrisiloxane that contained 170 ppm silanol group (SiOH group=22.0 mmol) as determined by FT-IR. The system was then azeotropically dried for 1 hour. After the system had been cooled to room temperature, 40.0 mL of a 1.63 N hexane solution of n-butyllithium (65.2 mmol) was added and the system was stirred for 15 minutes at room temperature. 6.67 g (61.4 mmol) trimethylchlorosilane was subsequently added to the system with stirring for 10 minutes at room temperature. This was followed by the addition of a mixture of 16.33 g (181.0 mmol) trimethylsilanol and 88 g dimethylformamide. The 1,1,3,3,5,5-hexamethylcyclotrisiloxane conversion was monitored by GLC. After 5.5 hours, this conversion had reached 80.2%, and 49.0 g (221.8 mmol) 3-methacryloxypropyldimethylchlorosilane and 24.3 g (332.7 mmol) diethylamine were added to the system at this point. The nonequilibration polymerization was terminated by stirring for 7.5 hours while heating at 60° C. The salt product was filtered off, and the filtrate was distilled in a vacuum to afford dimethylpolysiloxane having the 3-methacryloxypropyl group at only one molecular chain terminal. Analysis of this dimethylpolysiloxane by GPC yielded the following results: number-average molecular weight=11,550, dispersity=1.08. No peaks were observed other than the main peak. No silanol group absorption was observed when this dimethylpolysiloxane was analyzed by FT-IR.

The method of the present invention for the preparation of diorganopolysiloxane is characterized by its ability to synthesize high-purity diorganopolysiloxane having a functional group at only one molecular chain terminal.

Other variations and modifications may be made in the compounds, compositions, and methods described herein, without departing from the essential features and concepts of the present invention.

The forms of the invention described herein are exemplary only, and are not intended as limitations on the scope of the invention as defined in the appended claims.

That which is claimed is:

1. A method for the preparation of a diorganopolysiloxane with the formula $R(R_2SiO)_pB$ in which R is a monovalent hydrocarbon group, p is an integer with a value of at least 1, and B is the hydrogen atom or a group with the formula $-SiR_2R^1$ in which R is a monovalent hydrocarbon group and $R^1$ is the hydrogen atom, vinyl, allyl, butenyl, pentenyl, hexenyl, heptenyl, 3-methacryloxypropyl, 3-acryloxypropyl, 3-chloropropyl, 3-glycidoxypropyl, 3-aminopropyl, or 3-hydroxypropyl, by first subjecting (A) a cyclic trisiloxane with the formula $(R_2SiO)_3$ in which R is a monovalent hydrocarbon group to nonequilibration polymerization, optionally in the presence of (B) a silane or siloxane with the formula $R(R_2SiO)_mH$ in which R is a monovalent hydrocarbon group and m is an integer with a value of at least 1, under the effect of a (C) a lithium polymerization catalyst with the formula $R(R_2SiO)_nLi$ in which R is a monovalent hydrocarbon group and n is an integer with a value of at least zero to twenty, and subsequently terminating said nonequilibration polymerization with (D) a compound selected from the group consisting of an acid and a halosilane with the formula $R^1R_2SiX$ in which R and $R^1$ are defined above, and X is a halogen atom, characterized in that the silanol-containing impurity present in the cyclic trisiloxane (A) is preliminarily silylated with (E) a silylating agent.

2. A method according to claim 1 in which the silylating agent (E) is a silylating agent containing silicon-bonded halogen.

3. A method according to claim 1 in which the silylating agent (E) is a silylating agent containing silicon-bonded nitrogen.

4. A method for the preparation of a diorganopolysiloxane with the formula $R(R_2SiO)_pB$ in which R is a monovalent hydrocarbon group, p is an integer with a value of at least 1, and B is the hydrogen atom or a group with the formula $-SiR_2R^1$ in which R is a monovalent hydrocarbon group and $R^1$ is the hydrogen atom, vinyl, allyl, butenyl, pentenyl, hexenyl, heptenyl, 3-methacryloxypropyl, 3-acryloxypropyl, 3-chloropropyl, 3-glycidoxypropyl, 3-aminopropyl, or 3-hydroxypropyl, by first subjecting (A) a cyclic trisiloxane with the formula $(R_2SiO)_3$ in which R is a monovalent hydrocarbon group, to nonequilibration polymerization, in the presence of (B) a silane or siloxane with the formula $R(R_2SiO)_mH$ in which R is a monovalent hydrocarbon group and m is an integer with a value of at least 1, under the effect of (C) a lithium polymerization catalyst with the formula $R(R_2SiO)_nLi$ in which R is a monovalent hydrocarbon group and n is an integer with a value of at least zero to twenty, and subsequently terminating said nonequilibration polymerization with (D) a compound selected from the group consisting of an acid and a halosilane with the formula $R^1R_2SiX$ in which R and $R^1$ are defined above, and X is a halogen atom, characterized in that the silanol-containing impurity present in the cyclic trisiloxane (A) is preliminarily converted into a lithiated material by lithiation with (F) an organolithium compound and said lithiated material is then silylated with (G) a silylating agent that contains silicon-bonded halogen.

* * * * *